(12) United States Patent
Florczyk

(10) Patent No.: US 8,715,120 B2
(45) Date of Patent: May 6, 2014

(54) CHAIN GUIDE FOR A FRONT DERAILLEUR

(75) Inventor: Raymond Florczyk, Schwebheim (DE)

(73) Assignee: SRAM Deutschland GmbH (DE)

( * ) Notice: Subject to any disclaimer, the term of this patent is extended or adjusted under 35 U.S.C. 154(b) by 99 days.

(21) Appl. No.: 11/566,652

(22) Filed: Dec. 4, 2006

(65) Prior Publication Data

US 2007/0129191 A1 Jun. 7, 2007

(30) Foreign Application Priority Data

Dec. 3, 2005 (DE) .................. 10 2005 057 862

(51) Int. Cl.
*F16H 9/00* (2006.01)

(52) U.S. Cl.
USPC .............................................. 474/82; 474/80

(58) Field of Classification Search
USPC .......................... 474/78, 80, 81, 82
See application file for complete search history.

(56) References Cited

U.S. PATENT DOCUMENTS

| | | | |
|---|---|---|---|
| 4,223,562 A | 9/1980 | Nagano et al. | |
| 4,551,121 A | 11/1985 | Nagano | |
| 4,573,950 A | 3/1986 | Nagano | |
| 4,613,319 A | 9/1986 | Nagano | |
| 4,734,083 A | 3/1988 | Nagano | |
| 5,312,301 A | 5/1994 | Kobayashi | |
| 5,624,336 A * | 4/1997 | Kojima | 474/82 |
| 6,009,771 A * | 1/2000 | Desenclos et al. | 74/502.4 |
| 6,629,903 B1 | 10/2003 | Kondo | |
| 6,641,494 B1 | 11/2003 | Campagnolo | |
| 6,641,495 B2 * | 11/2003 | Valle | 474/80 |
| 6,902,503 B2 * | 6/2005 | Nanko | 474/80 |
| 6,923,740 B2 * | 8/2005 | Nanko | 474/82 |
| 6,962,544 B2 * | 11/2005 | Nanko | 474/80 |
| 6,986,723 B2 * | 1/2006 | Valle | 474/80 |
| 7,014,584 B2 * | 3/2006 | Nanko et al. | 474/80 |
| 7,438,657 B2 * | 10/2008 | Nakai et al. | 474/80 |
| 7,806,792 B2 * | 10/2010 | Fujii et al. | 474/80 |
| 8,491,428 B2 * | 7/2013 | Emura et al. | 474/80 |

(Continued)

FOREIGN PATENT DOCUMENTS

| | | |
|---|---|---|
| DE | 197 06 156 A1 | 8/1998 |
| DE | 100 36 768 A1 | 3/2001 |

(Continued)

OTHER PUBLICATIONS

E1A Shimano Inc. "2006 Bicycle Components Trade Sales & Support Manual" pp. 98-99, Friedrichshafen, Germany: Shimano Inc, 2005.

(Continued)

*Primary Examiner* — Thomas Irvin

(74) *Attorney, Agent, or Firm* — Milan Milosevic; Lisa Serdynski; Steven Courtright

(57) ABSTRACT

A chain guide for a front derailleur includes inner and outer guide plates. The outer guide plate includes an interior surface having a guide surface that protrudes toward the chain. During the shifting from a larger chainring to a smaller chainring, the chain grazes against the guide surface and is shifted to an adjoining chainring by the guide surface. Viewed in a chain travel direction, the guide surface has a width at least equal to a distance between consecutive outer chain links or a width at least equal to the distance between the link pins. So configured, the noise generated by the dipping of the chain guide into the space between the outer chain links and/or between any protruding link pins is minimized during the shifting process.

2 Claims, 2 Drawing Sheets

(56) References Cited

U.S. PATENT DOCUMENTS

| | | | |
|---|---|---|---|
| 2003/0100393 A1* | 5/2003 | Nanko | 474/80 |
| 2010/0022335 A1* | 1/2010 | Chiang | 474/80 |
| 2011/0183795 A1* | 7/2011 | Emura et al. | 474/80 |

FOREIGN PATENT DOCUMENTS

| | | |
|---|---|---|
| EP | 0 348 977 A | 1/1990 |
| EP | 0 713 823 B1 | 5/1996 |
| EP | 0 936 134 B1 | 8/1999 |
| EP | 1 147 978 A | 10/2001 |
| EP | 1 314 636 A2 | 5/2003 |

OTHER PUBLICATIONS

E1Av2 Shimano Inc. "2006 Bicycle Components Trade Sales & Support Manual" pp. 98-101, Friedrichshafen, Germany: Shimano Inc, 2005.

E1B Affidavit of Nishioka related to Item E1A (Item 1) concerning date of E1A and disclosure of M530 and M531 front derailleur.

E1C Photographs 1-4 of front derailleur (FD-M530) shown in E1A, Item 1 above.

E2A Shimano Inc, "2006 Components Trade Sales & Support Manual" pp. 98-99, Friedrichshafen, Germany: Shimano Inc, 2005.

E2B Affidavit of Nishioka related to E2A (Item 5) concerning date of E2A and disclosure of M530 and M531 front derailleur.

E2C Photographs 1-4 of front derailleur (FD-M531) shown in E2A (Item 5).

E3A Shimano Inc, "2000 Bicycle Components Trade Sales & Support Manual" p. 129-136, Japan: Shimano Inc, 1999.

E3B Shimano Inc, "Shimano Tourney Top Swing Umwerfer FD-TY32-A" sheet 54, Japan: Shimano Inc, 1999.

E3C Photographs 1-4 of front derailleur (FD-TY32-A) shown in E3A and E3B, Items 8 and 9 above.

E4 Shimano Inc, "2004 Bicycle Components Trade Sales & Support Manual" p. 80, Japan: Shimano Inc, 2003.

E5 Suntour, "Suntour Small Parts Catalog Front Derailleur FD-3800" p. 73, Suntour, 1986.

E9 Drawing of Shimano CN-HG53 Chain showing measured dimensions.

E10A Shimano "2001 Bicycle Components Trade Sales & Support Manual" p. 73, published Aug. 2000.

E10B Shimano "2002 Bicycle Components Trade Sales & Support Manual" p. 75, published Aug. 2001.

E10Bv2 Shimano "2002 Bicycle Components Trade Sales & Support Manual" pp. 75-115, published Aug. 2001.

E10C Shimano "2003 Bicycle Components Trade Sales & Support Manual" p. 79, published Aug. 2002.

E10D Shimano "2004 Bicycle Components Trade Sales & Support Manual" p. 70, published Aug. 2003.

E10E Shimano "2005 Bicycle Components Trade Sales & Support Manual" p. 74, published Aug. 2004.

E10F Shimano "2006 Bicycle Components Trade Sales & Support Manual" p. 76, published Aug. 2005.

E10G Marked up drawing which appears in 14-20 inclusive (E10A to E10F).

\* cited by examiner

CHAIN GUIDE FOR A FRONT DERAILLEUR

BACKGROUND OF THE INVENTION

The present invention relates to front derailleurs for bicycles and more particularly to a front derailleur including a chain guide configured to minimize shifting noises.

A bicycle derailleur, in particular a front derailleur, shifts a bicycle chain from one chainring to an adjoining chainring. This shifting operation is initiated by a shifting motion of the chain cage or chain guide that runs transverse to the travel direction of the chain. The shifting operation may occur in both directions from a larger chainring to a next smaller chainring or from a smaller chainring to a next larger chainring. The chain runs between inner and outer guide plates of the chain guide and, depending on the desired shifting direction, is shifted by either the inner or outer guide plate to the adjoining chainring. These guide plates each have interior surfaces facing the chain adapted to the respective shifting directions.

EP 1 314 636 A2 discloses a chain guide or a chain cage having inner and outer guide plates. The chain is disposed between the guide plates and includes inner and outer links connected by link pins. An interior surface of the outer guide plate protrudes inwardly to form a guide surface that has upper, middle, and lower regions with different shapes and offsets. The upper region of the guide surface contacts the chain when it is shifted from a larger chainring to a middle chainring. The lower region is used when shifting the chain from the middle chainring to a smaller chainring. The lower, middle, and upper regions of the guide surface have different offsets causing shifting noises when the chain grazes across them during shifting operations. The guide surface has a relatively narrow width for contacting the chain, when viewed in the direction of the chain travel. When the narrow-width guide surface comes into contact with the chain and dips into the gap between the outer chain links, shifting noises result. These shifting noises also occur in many other chain guide configurations.

SUMMARY OF THE INVENTION

An object of the present invention is to provide a front derailleur having a chain guide that minimizes shifting noises during a shifting operation by inhibiting the chain guide from dipping between the outer links of the chain.

The present invention provides a chain guide for a front derailleur for shifting a chain between chainrings. The chain includes inner and outer links connected by link pins. The chain guide includes inner and outer guide plates, each having an interior surface for engaging the chain. The interior surface of the outer guide plate includes a guide surface. The guide surface has a width large enough to inhibit the guide surface from dipping into a region between the outer links of the chain. Here, the width of the guide surface in a chain travel direction of the chain is at least equal to a distance between the consecutive outer links of the chain. This is also true of a section of the guide surface that extends upward, which guides the rising chain during the shifting operation onto a larger chainring.

The guide surface of the outer guide plate has a length configured to extend along the outer guide plate to engage the chain during gear shifts from a larger chainring to a smaller chainring. The guide surface has a substantially uniform offset from a non-protruding surface of the interior surface of the outer guide plate. The outer guide plate includes a smooth transition from the non-protruding surface of the interior surface to the guide surface along its width as viewed along the chain travel direction. In another embodiment of the present invention, the width of the guide surface in the chain travel direction is at least equal to the distance between adjoining link pins, where the link pins protrude beyond an outer surface of the outer link.

The interior surface of the outer guide plate also includes a non-protruding interior surface disposed forward of the guide surface along the chain travel direction. This configuration prevents the chain from overshooting the large chainring when shifting from a smaller chainring to the large chainring.

These and other features and advantages of the invention will be more fully understood from the following description of certain embodiments of the invention, taken together with the accompanying drawings.

DETAILED DESCRIPTION

Figure 1:
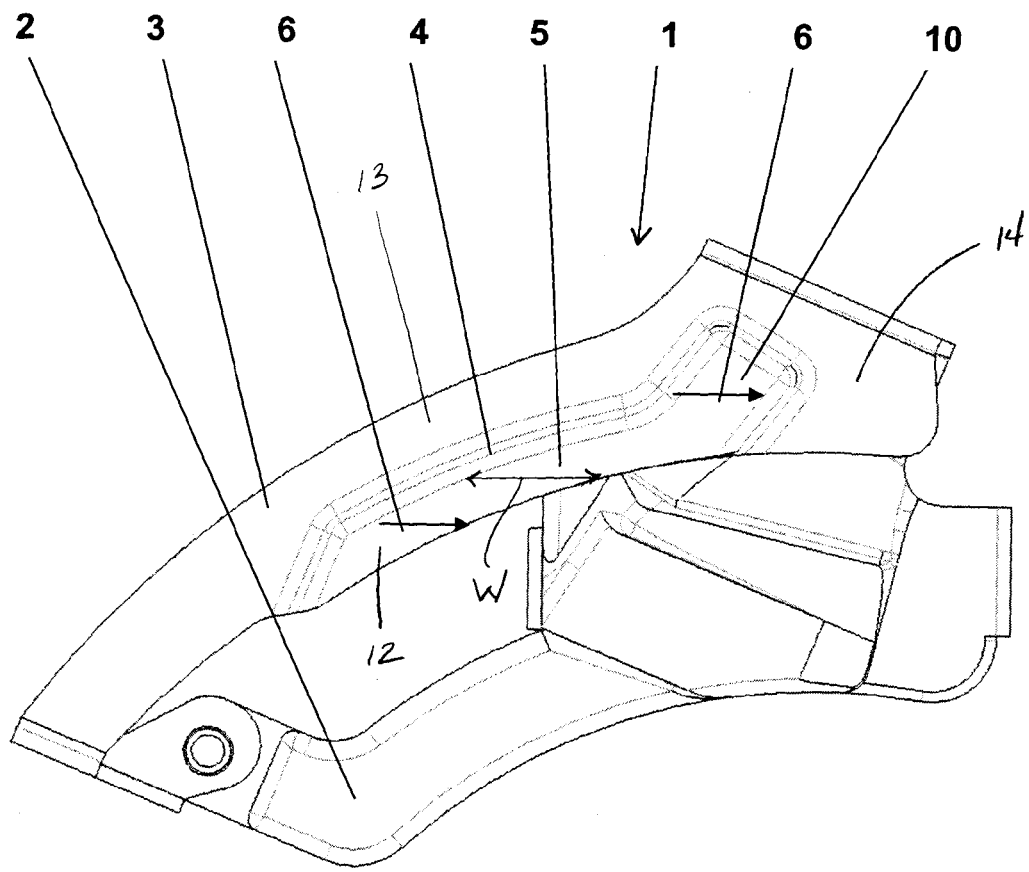
FIG. 1 is a side view of a chain guide in accordance with one embodiment of the present invention.
Figure 2:
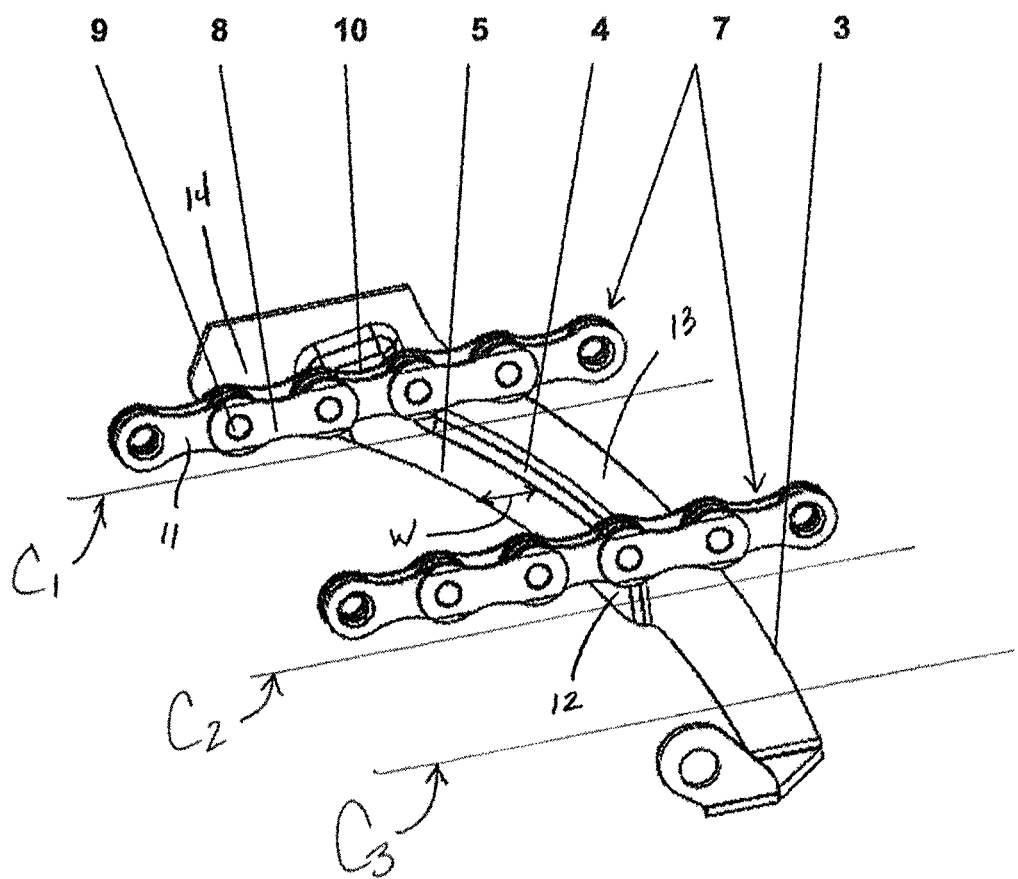
FIG. 2 is a perspective view of an outer guide plate of the chain guide engaging a chain.

FIGS. 1 and 2 illustrate a chain guide 1 for a bicycle front derailleur in accordance with one embodiment of the present invention. The chain guide 1 shifts a chain 7 between chainrings. The chain 7 includes inner and outer links 11, 8 connected by link pins 9. The chain guide 1 includes inner and outer guide plates 2, 3, each having interior surfaces including guide surfaces for guiding the chain during a shifting operation. The chain guide 1 forms a closed chain cage that surrounds the chain.

The guide surface 5 of the outer guide plate 3 need not extend along the entire length of the outer guide plate 3; rather, it only needs to extend long enough to engage the chain 7 during gear shifts onto the larger chainrings. The guide surface 5 includes upper and lower sections 10, 12. The upper section 10 includes an upwardly extending extension, which guides the rising chain during the shifting operation onto a larger chainring. The guide surface 5 is substantially uniformly offset from a non-protruding surface 13 of the interior surface 4. This configuration simplifies production, in particular the cold deformation of the chain guide 1. During a shifting operation, the guide surface 5 urges the chain out of its current path onto a smaller chainring. To prevent the chain from catching an edge during a shift operation, interior surface 4 may include a smooth transition from its non-protruding surface 13 to the guide surface 5 such as a chamfer or rounded steps. The guide surface 5 is configured such that when viewed in the chain travel direction 6, it has a width W at least equal to a distance between consecutive outer links 8 of the chain 7, inhibiting the chain guide from dipping between the outer links. In another embodiment of the present invention, the width of the guide surface in the chain travel direction is at least equal to the distance between adjoining link pins, where the link pins protrude beyond an outer surface of the outer link 8.

FIG. 2 shows sections of the chain 7 engaging the outer guide plate 3 in the region of the largest chainring $C_1$, and alternatively in the region of the adjacent second-largest chainring $C_2$. The guide surface 5 shifts the chain onto the second-largest chainring $C_2$ or the smallest chainring $C_3$. The transition from the non-protruding surface 13 to the guide surface 5 is smoothened in the chain travel direction 6 to minimize rasping noises between the chain and the guide surface. The interior surface 4 includes a non-protruding interior surface 14 disposed forward of the upper section 10 of the guide surface 5 which is helpful for preventing the chain 7 from overshooting and derailing beyond the largest chainring $C_1$.

While this invention has been described by reference to certain embodiments, it will be understood that numerous changes could be made within the spirit and scope of the inventive concepts described. Accordingly, it is intended that the invention not be limited to the disclosed embodiments, but that it include the full scope permitted by the language of the following claims.

What is claimed:

1. A chain guide of a front derailleur for shifting a chain between three chainrings, the chain having inner and outer links connected by link pins, the chain guide comprising:
    an inner guide plate; and
    an outer guide plate connected to the inner guide plate, the outer guide plate including an interior surface having a guide surface protruding toward the chain and a non-protruding surface offset from the guide surface, the guide surface having a length configured to extend along the outer guide plate to engage the chain during gear shifts between the chainrings, the guide surface having a width in a chain travel direction at least equal to a distance between consecutive outer links of the chain, the guide surface having a lower section and an upper section, the lower section extending to and along a lower edge of the outer guide plate to contact the chain when the chain is engaged on a largest one of the three chainrings and to contact the chain when the chain is engaged on a middle one of the three chainrings, the upper section extending upwardly from the lower section of the guide surface and the lower edge of the outer guide plate, the entire guide surface having a constant elevation in relation to the non-protruding surface and wherein the chain slides over the guide surface during a shift process to the adjacent, next smaller chainring;
    a portion of the non-protruding surface disposed forward of the guide surface along the chain travel direction from the non-protruding surface to the guide surface.

2. The chain guide according to claim 1 wherein the outer guide plate includes a smooth transition from the non-protruding surface of the interior surface to the guide surface.

* * * * *